United States Patent [19]
Rodriguez, Jr. et al.

[11] Patent Number: 6,082,864
[45] Date of Patent: Jul. 4, 2000

[54] PROJECT OR HAVING A SELF-ALIGNING REPLACEABLE PROJECTION LAMP MECHANISM

[75] Inventors: Ernesto M. Rodriguez, Jr., Round Rock, Tex.; Paul A. Müller, Nuess, Germany

[73] Assignees: Ed. Liesegang; Minnesota Mining and Manufacturing Company, both of St. Paul, Minn.

[21] Appl. No.: 08/939,994

[22] Filed: Sep. 29, 1997

[51] Int. Cl.$^7$ .................................................. G03B 21/00
[52] U.S. Cl. ............................................ 353/87; 362/254
[58] Field of Search .................................. 353/87, 85, 52, 353/56, 61; 362/285, 254, 288

[56] References Cited

U.S. PATENT DOCUMENTS

| | | | |
|---|---|---|---|
| 3,314,330 | 4/1967 | Finke | 353/87 |
| 3,761,170 | 9/1973 | Genesky et al. | 353/87 |
| 3,959,612 | 5/1976 | Feinbloom | 200/11 R |
| 4,390,935 | 6/1983 | Audesse et al. | 362/306 |
| 5,091,835 | 2/1992 | Malek et al. | 362/294 |
| 5,287,132 | 2/1994 | Suzuki et al. | |
| 5,296,883 | 3/1994 | Park et al. | |
| 5,347,324 | 9/1994 | Sasaki et al. | |
| 5,398,041 | 3/1995 | Hyatt | 345/88 |
| 5,432,526 | 7/1995 | Hyatt | 345/87 |
| 5,461,554 | 10/1995 | Leonetti et al. | 362/390 |
| 5,541,826 | 7/1996 | Sandell et al. | 362/217 |
| 5,550,604 | 8/1996 | Gale et al. | |
| 5,630,659 | 5/1997 | Ronzani et al. | |
| 5,639,152 | 6/1997 | Nelson | |
| 5,669,688 | 9/1997 | Baar et al. | 353/119 |

FOREIGN PATENT DOCUMENTS

| | | | |
|---|---|---|---|
| 0 594 508 A1 | 4/1994 | European Pat. Off. | G03B 21/132 |
| 2 592 705 | 1/1986 | France | F21Q 3/00 |
| 9-96869 | 4/1997 | Japan | G03B 21/16 |
| 2 083 195 | 3/1982 | United Kingdom | F21V 19/04 |

OTHER PUBLICATIONS

OSRAM HMI 123, found in "Metal Halide Lamps Photo Optics" catalog, pages include: Cover, pp. 4–9, 34, and Index.
SYLVANIA Data Sheet, Metal Halide Lamp BS 400 DE 055.
3M MP8630 Multimedia Projector, Operator's Guide w/picture.
3M MP8650 Multimedia Projector Operator's Guide w/picture.
Proxima Lightbook, Multimedia Notebook Projector, User's Guide w/picture.

*Primary Examiner*—William Dowling
*Attorney, Agent, or Firm*—Nestor F. Ho

[57] ABSTRACT

A liquid crystal display projector for projecting images on a screen. The projector includes a projector body and an optical projection system positioned generally within the projector body. A releasable first self-aligning lamp socket for receiving a first end of a longitudinal replaceable bulb and a releasable second self-aligning lamp socket for receiving a second end of a longitudinal replaceable bulb are mounted on a hinged platform coupled to the projector body. The platform has a first position where the platform swings the bulb outside of the projector body and a second position where the platform swings the bulb into an interior position inside the projector body optically aligned with respect to the optical projection system.

20 Claims, 10 Drawing Sheets

PROJECT OR HAVING A SELF-ALIGNING REPLACEABLE PROJECTION LAMP MECHANISM

BACKGROUND OF THE INVENTION

1. Field of Invention

The present invention relates generally to a projector having a lamp assembly that allows the user to replace the projection lamp easily and economically. More specifically, the present invention describes a liquid crystal display ("LCD") projector including a pivoting easy-access self-aligning projection lamp assembly that employs cost-efficient metal halide bulbs. The lamp assembly of the present invention includes unidirectional and pre-aligned lamp sockets that automatically align and orient the lamp in the correct optical position within the projector.

2. Description of the Prior Art

Various types of projectors, such as overhead and LCD projectors, are known in the prior art. Generally, these projectors include a lamp, that is, a light source such as an incandescent or quartz bulb, that enables the projection of images onto a screen. The term lamps also includes lasers and halogen, metal halide, and fluorescent bulbs, as well as other sources of light known in the art.

Projectors typically include relatively complex optical projection systems that direct and focus the light from the lamp. Careful alignment and orientation of the lamp within the optical projection system is very important to obtaining bright and well-defined projected images.

Traditionally, projection lamps have been specifically designed for a projector and have been very costly components. Lamp replacement usually was awkward, requiring a technician to dismantle part of the projector housing and to reach into the projector housing and carefully manipulate the glass bulb to ensure proper alignment. The dependence on securing a technician and a replacement bulb limited the reliability of projectors for out-of-town and portable presentations.

Attempts have been made to design projector systems that allow for the replacement of lamps by the user. To eliminate the need to disassemble part of the projector to gain access to the lamp, some designs have included replacement lamps already housed within the projector housing. For example, one design included rotary plates having a plurality of arc tubes and blocks. By rotating a set of cams, an old burnt arc tube was separated from the lamp and a new arc tube was replaced as the light source. Nevertheless, in internal replacement systems the replacement bulbs and the replacement mechanism occupy significant space inside of the projector body, a problem when designing compact or portable projectors. Furthermore, internal replacement systems eventually exhaust the internal supply of bulbs, again necessitating the dismantling of the projector before new bulbs may be installed.

Other designs have attempted to simplify lamp replacement by utilizing different variations of a connectorized lamp cartridge. A lamp is potted and factory aligned within a cartridge that includes cables, connectors and reflectors. The cartridge is accessed by removing an access panel and pulling out the entire cartridge. The old cartridge is discarded and an entire new cartridge is positioned inside of the projector unit. The cartridge replacement system offers relative ease of use and the advantage of having the lamp pre-aligned in optimal position with respect to the reflector and the entire optical projection system. However, replacement of the entire cartridge usually is expensive. In accessing and replacing the cartridge in some designs, the user is given access to the interior regions of the projector housing, which increases the danger of electrical shock or of damage to the precise components of the projector.

Other designs have discussed the use of cartridges including replaceable plug-in halogen lamps. However, halogen lamps lack the luminous efficacy of metal halide lamps. The entire cartridge still has to be removed from and inserted into the projector body. Cartridge replacement systems include a number of loose parts which may be misplaced by the user.

The need remains for a projector that allows for easy access and replacement of a projector lamp. An advantageous design would be user intuitive and would not require special training or tools to replace and align the lamp. In addition, a preferred design would allow the use of brighter metal halide lamps.

SUMMARY OF THE INVENTION

The present invention comprises a projector having a self-aligning replaceable lamp assembly. The projector includes a projector body having a lamp assembly recess, an LCD panel, an optical projection system, and a lamp assembly. The projector also may include a removable lamp door generally covering the recess.

The lamp assembly includes a lamp mount coupled by a hinge to the projector body. The lamp mount has an open position where the lamp mount swings outside of the projector body and a closed position where the lamp mount swings into the recess inside the projector body.

The lamp mount includes a first and a second lamp socket aligned for receiving the lamp. Each socket includes an electrical contact for making an electrical connection to a respective end electrical terminal of the lamp and a heat sink for controlling the temperature of the lamp. In one embodiment, the sockets are unidirectional electrically conductive spring biased clamps. The lamp is an elongated metal halide lamp having two end electrical terminals. The sockets automatically align and orient the lamp when the lamp is replaced. The lamp mount and the projector body include a registration mechanism that secures and optically aligns the lamp in the closed position of the lamp mount with respect to the optical projection system.

DETAILED DESCRIPTION OF THE INVENTION

Figure 1:
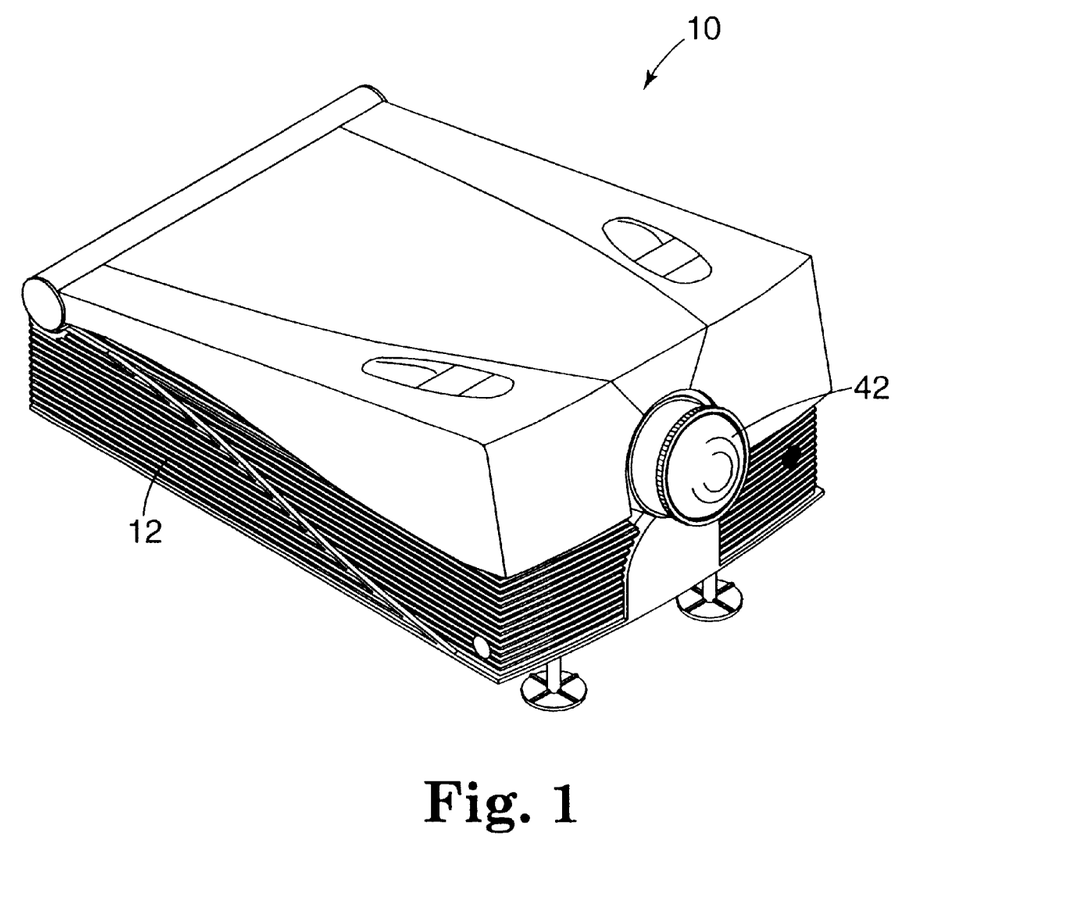
FIG. 1 is a front, side and top perspective view of an electronic projector in accordance with the present invention.
Figure 2:
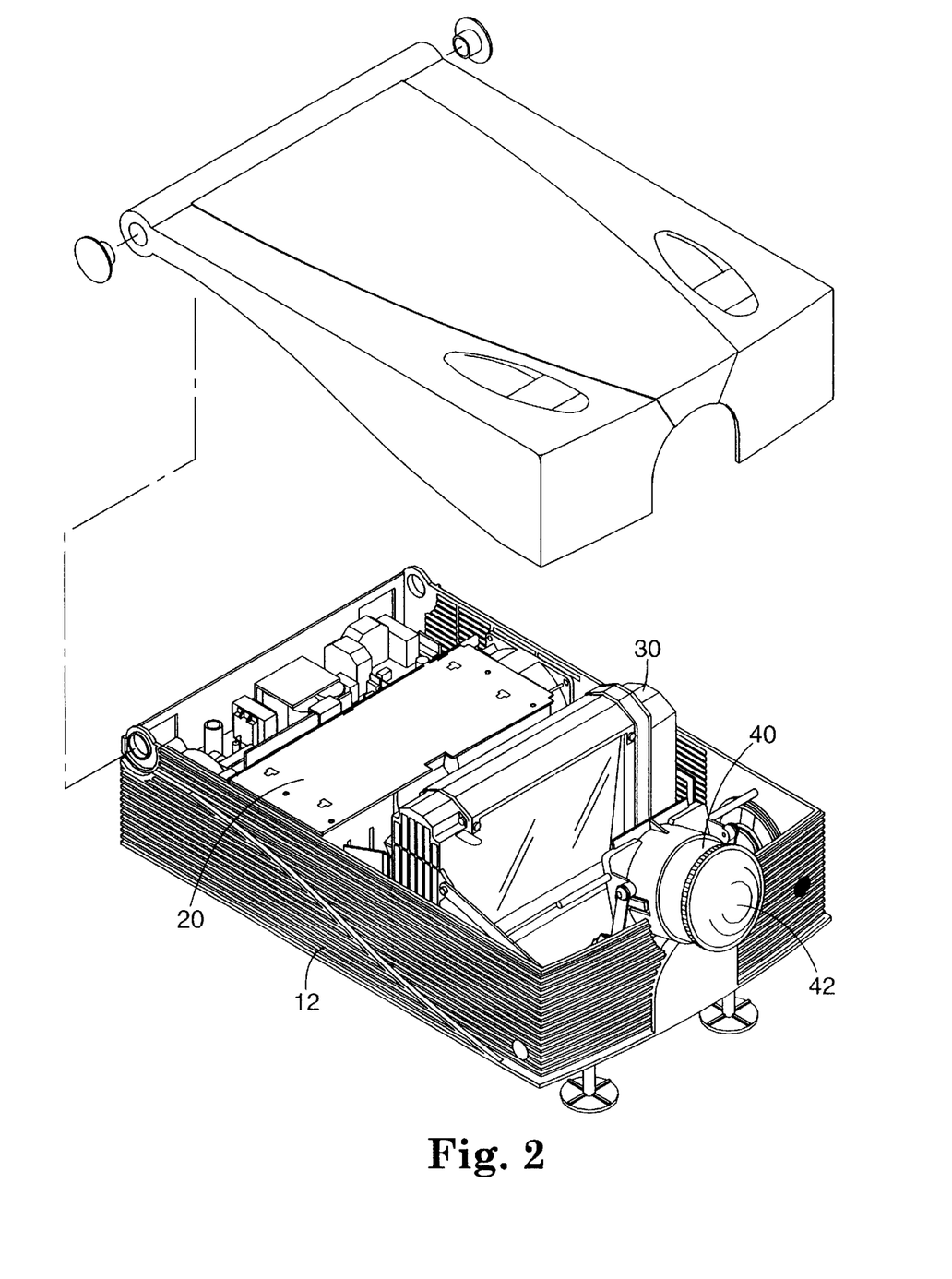
FIG. 2 is an exploded perspective view of the projector illustrated in FIG. 1.

An electronic projector 10 in accordance with the present invention is illustrated in FIG. 1. Those skilled in the art will appreciate that the present invention may be included in a variety of projector designs, including overhead, rear projection and slide projectors. FIG. 2 illustrates the projector 10 in greater detail. The electronic projector 10 includes a body 12, a lamp assembly 20, an LCD panel 30 and an optical projection system 40. The optical projection system 40 comprises a main focusing lens 42, a reflector 44 and a condenser 46, illustrated in FIG. 3. Other embodiments may contain a plurality of optical devices such as mirrors and lenses. The LCD panel 30 is a display device, such as the 6.4" Amorphous TFT from Sharp, Japan.

Figure 3:
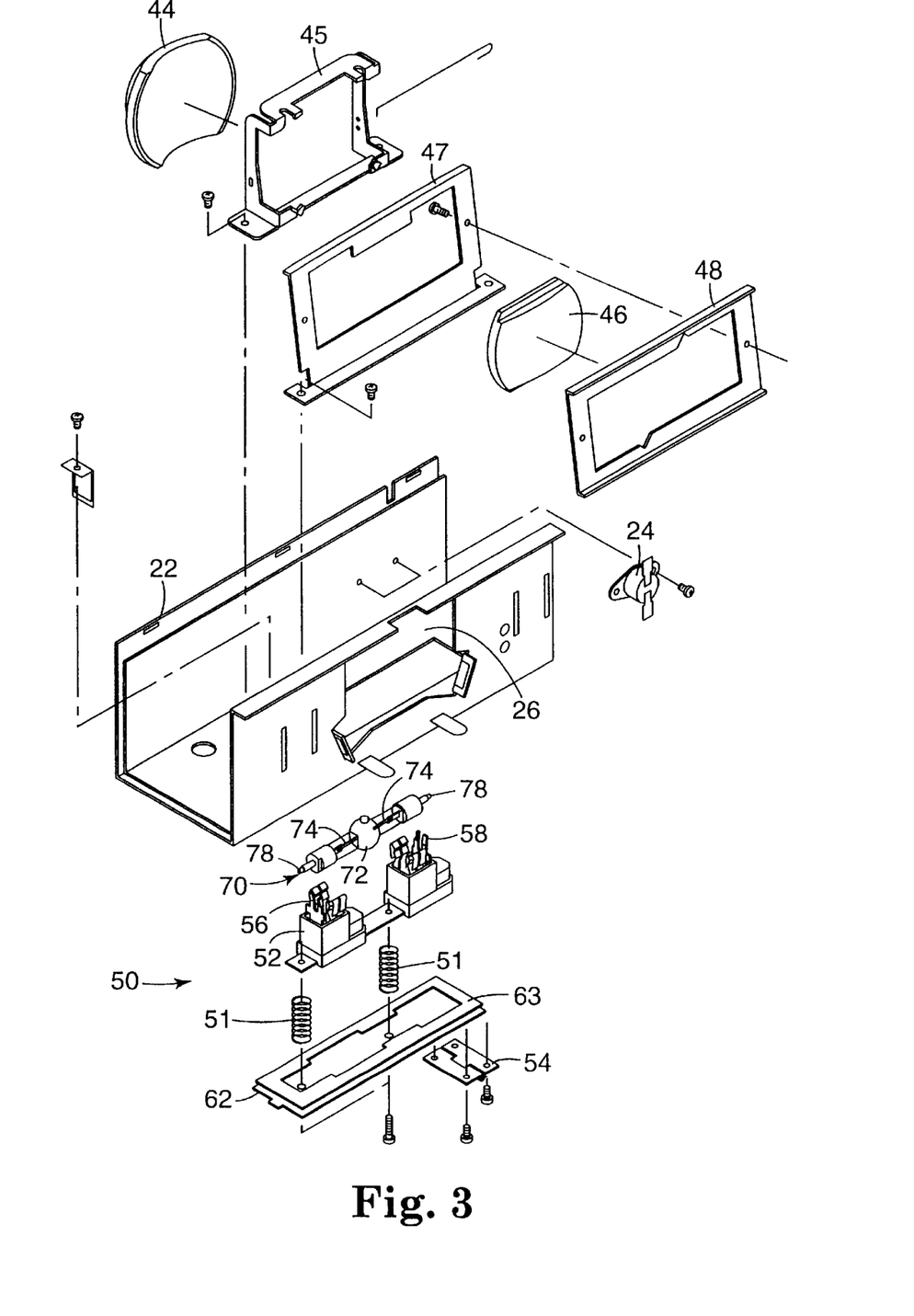
FIG. 3 is an exploded perspective view of the lamp assembly of the projector illustrated in FIG. 1.

The components of lamp assembly 20 are illustrated in FIG. 3. Optical components include the dichroic reflector 44 and the freeform condenser 46. The reflector 44 is held by a reflector mount 45, and the condenser 46 is held by a back condenser mount 47 and a front condenser mount 48. Components 44–48 are placed generally along a side wall of a thermal plenum 22. A thermostat 24 also is placed on the side wall of the plenum 22.

A lamp mount 50 is positioned aligned in a recess 26 on the opposite side wall of the plenum 22. The lamp mount 50 includes adjustment springs 51, a platform 52, a hinge 54, a first lamp socket 56, a second lamp socket 58, and power cables 60 (better seen in FIG. 6) mounted on an interior face of a registration bracket 62. A lamp 70 is secured, electrically connected, and aligned by the lamp mount 50.

Figure 4:
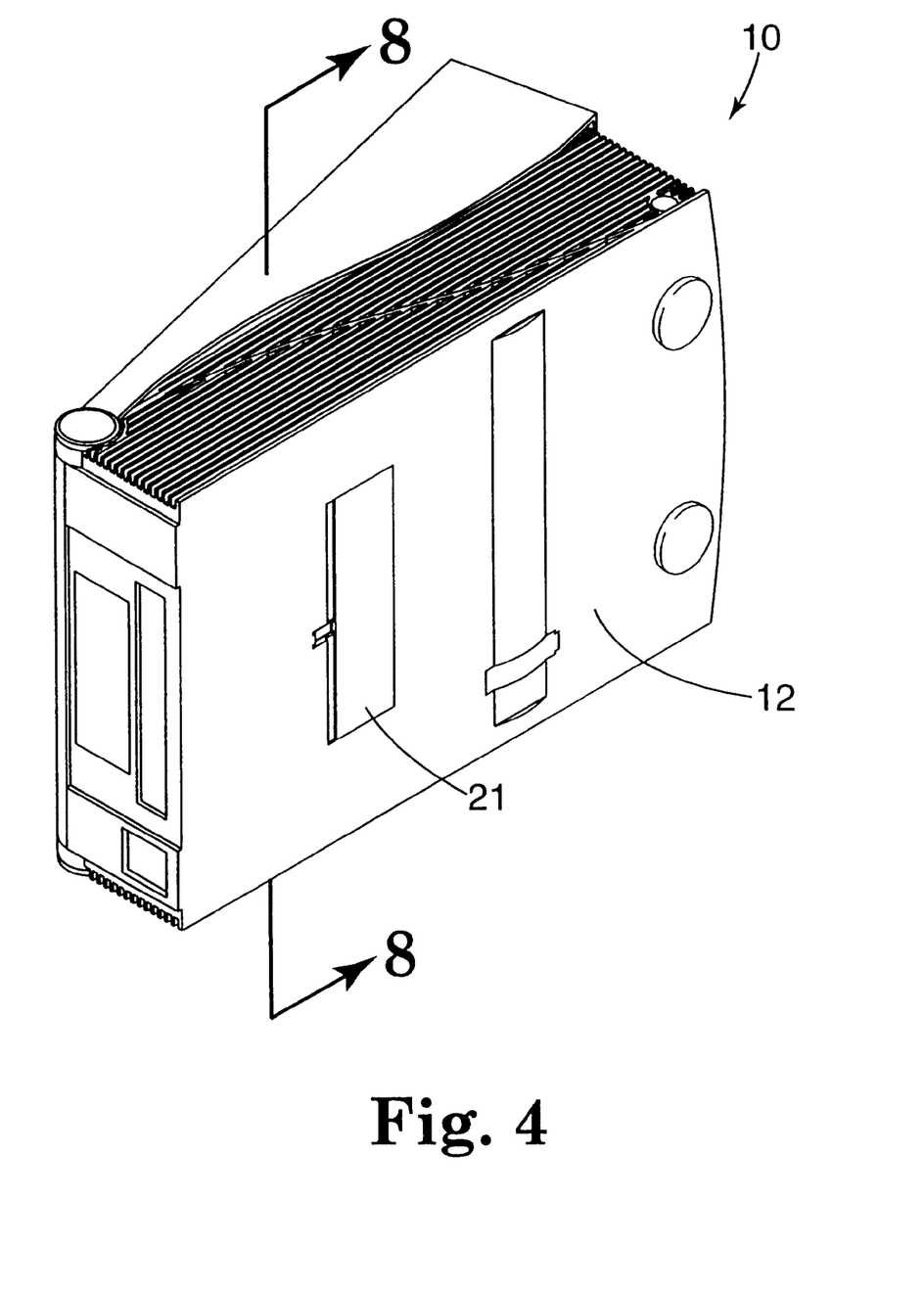
FIG. 4 is a perspective front, side and bottom view of the projector illustrated in FIG. 1.

The positioning and alignment of the lamp assembly 20 with respect to the LCD 30 and the optical projection system 40 is important in providing the desired definition and brightness of the projected images. The projector 10, as seen in FIG. 4, is designed such that the lamp 70 is positioned in a relatively accessible position, near a bottom portion of the projector body 12. In other embodiments, the lamp may be positioned in other accessible locations, such as one of the side walls of the projector 10.

Figure 5:
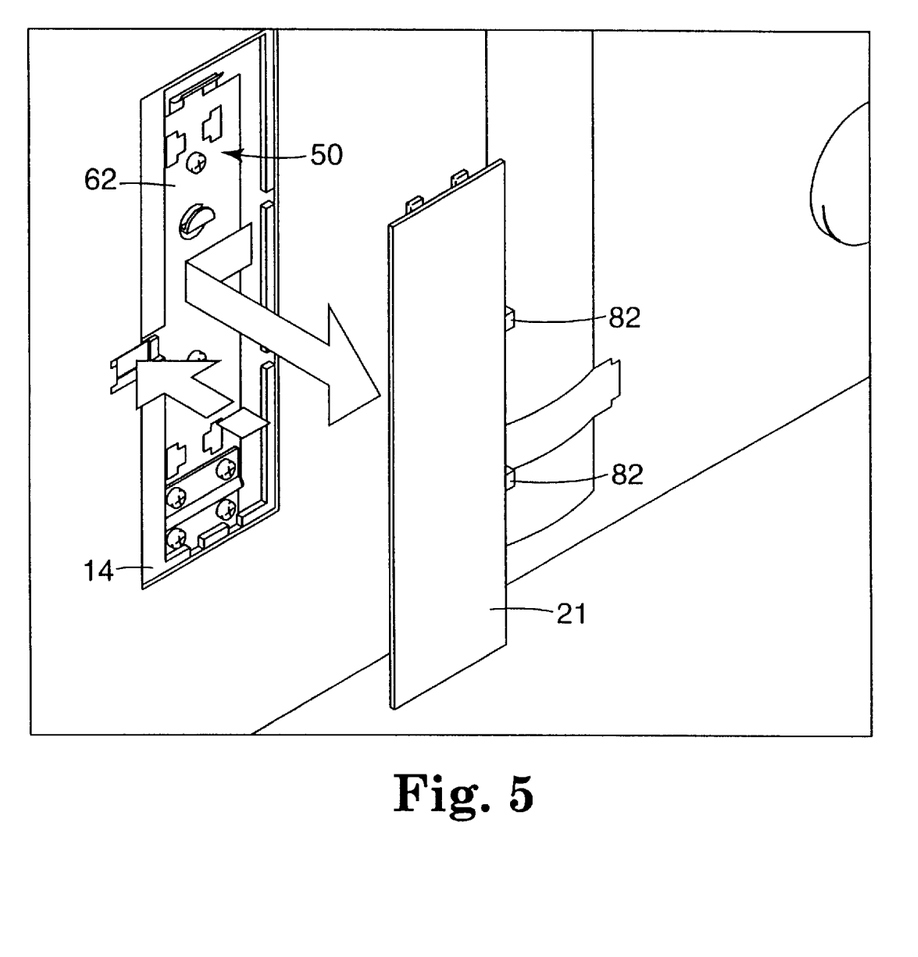
FIG. 5 is an enlarged detail of the lamp access door of the electronic projector illustrated in FIG. 1.

The outer housing or body 12 of the electronic projector 10 is made generally of plastic materials, although housings made of metal or other materials known in the art also are possible. The body 12 includes a recess 14 located on the periphery of the housing generally adjacent to the location of the lamp 70. Registration profiles 64, including a lip that prevents the over rotation of the lamp mount, are molded about the periphery of recess 14. An access panel or door 21 is located at the bottom of electronic projector 10 as illustrated in FIGS. 4 and 5. Access door 21 latches onto the body 12 to generally cover the recess 14 and the outer face of the registration bracket 62. In alternative embodiments, the access door 22 may be omitted, or may be hingedly connected to the outer housing 12.

Figure 6:
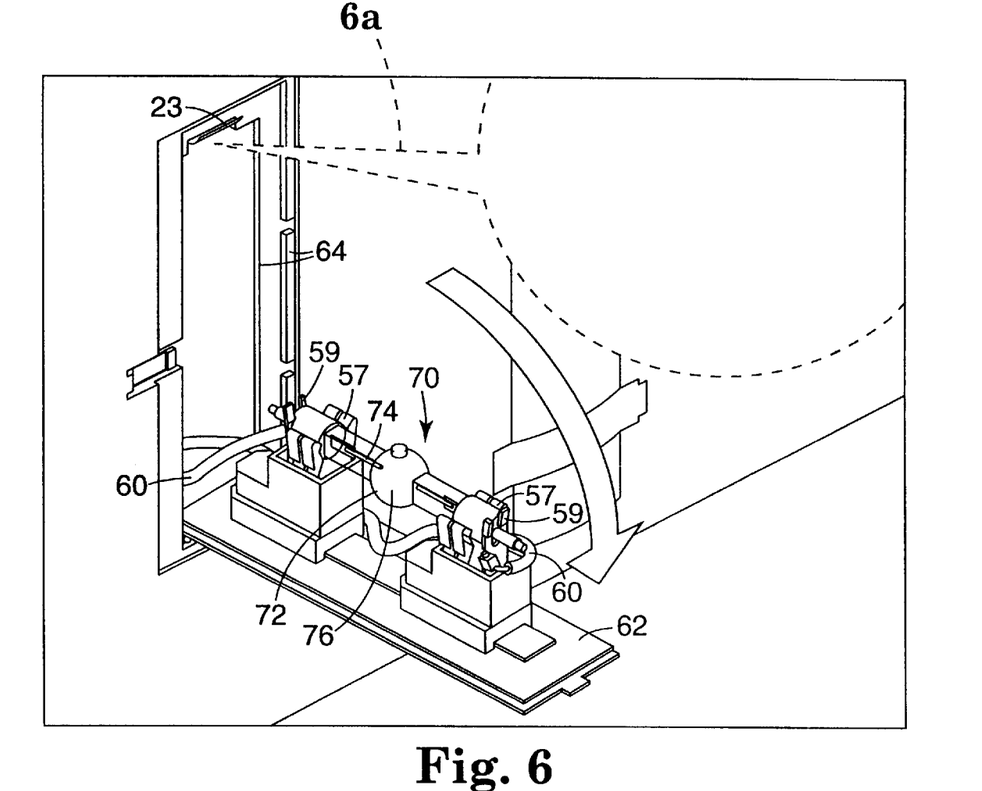
FIG. 6 is an enlarged perspective view of the lamp assembly of the electronic projector illustrated in FIG. 1.
Figure 6A:
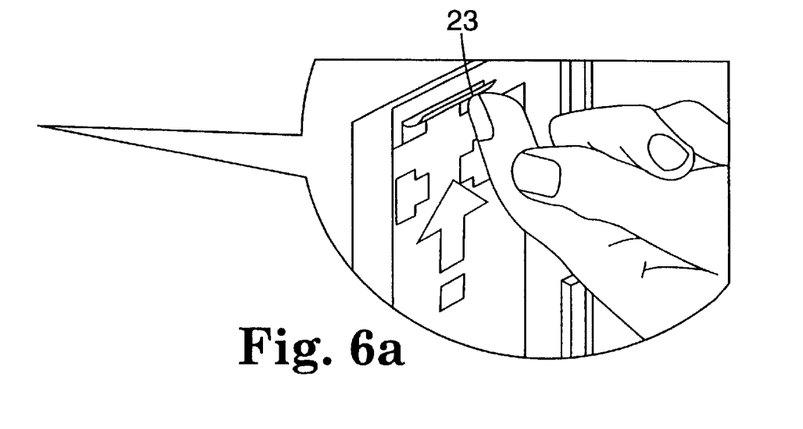
Figure 7:
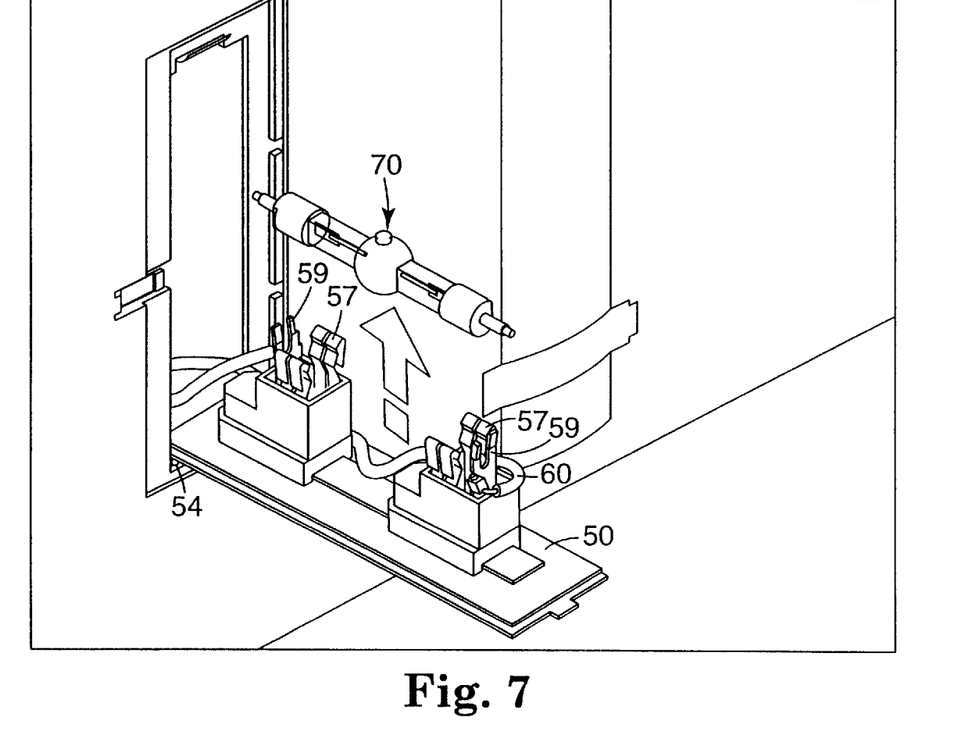
FIG. 7 is an enlarged perspective view of the lamp assembly illustrated in FIG. 5 including detail on the replacement of a lamp.
Figure 7A:
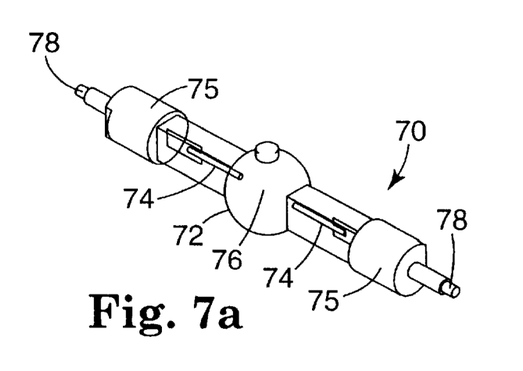
Figure 8:
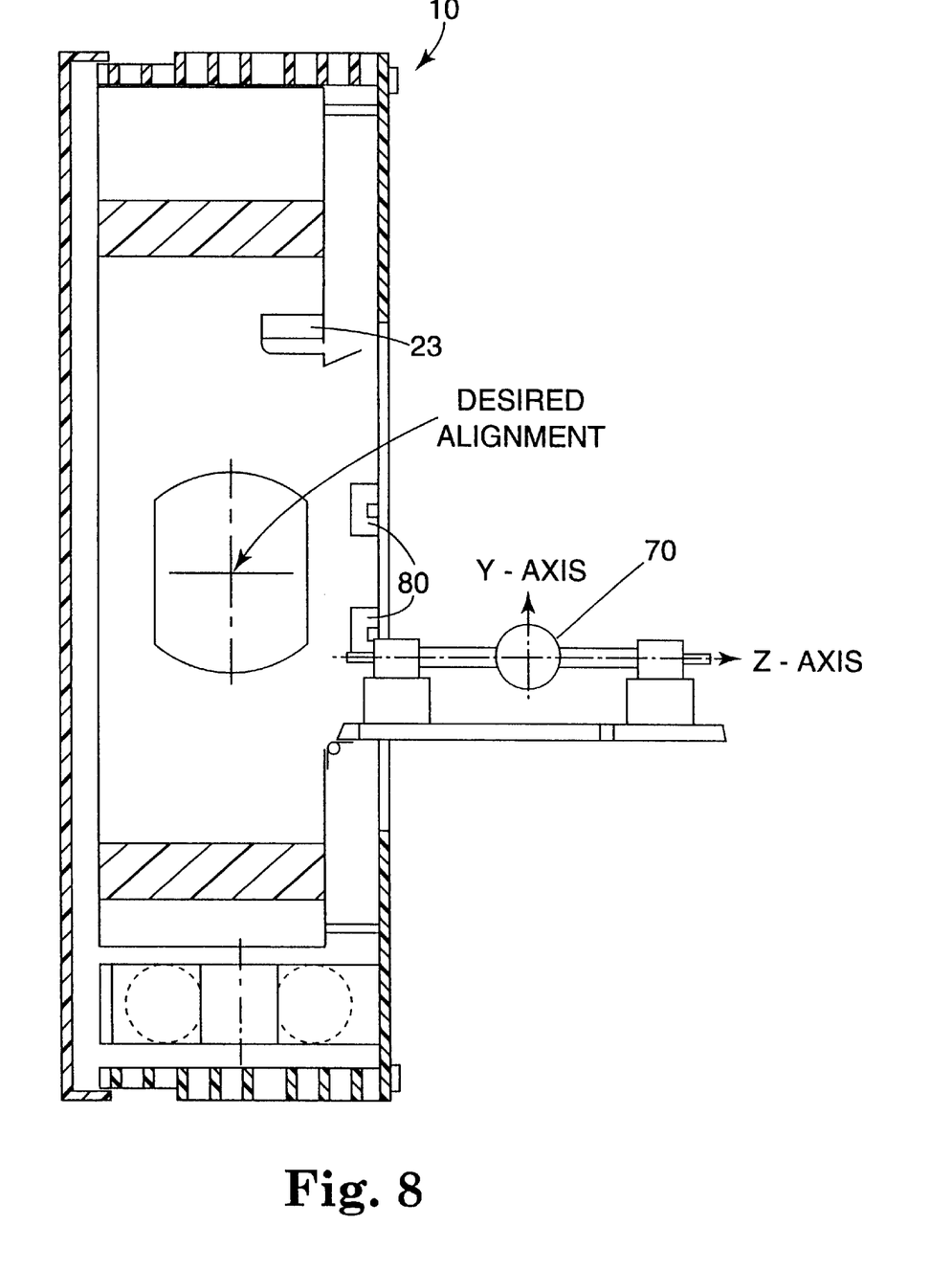
FIG. 8 is an elevation view of a cross-sectional cut at line 8—8 of the lamp assembly of the projector illustrated in FIG. 1 in the open position.
Figure 9:
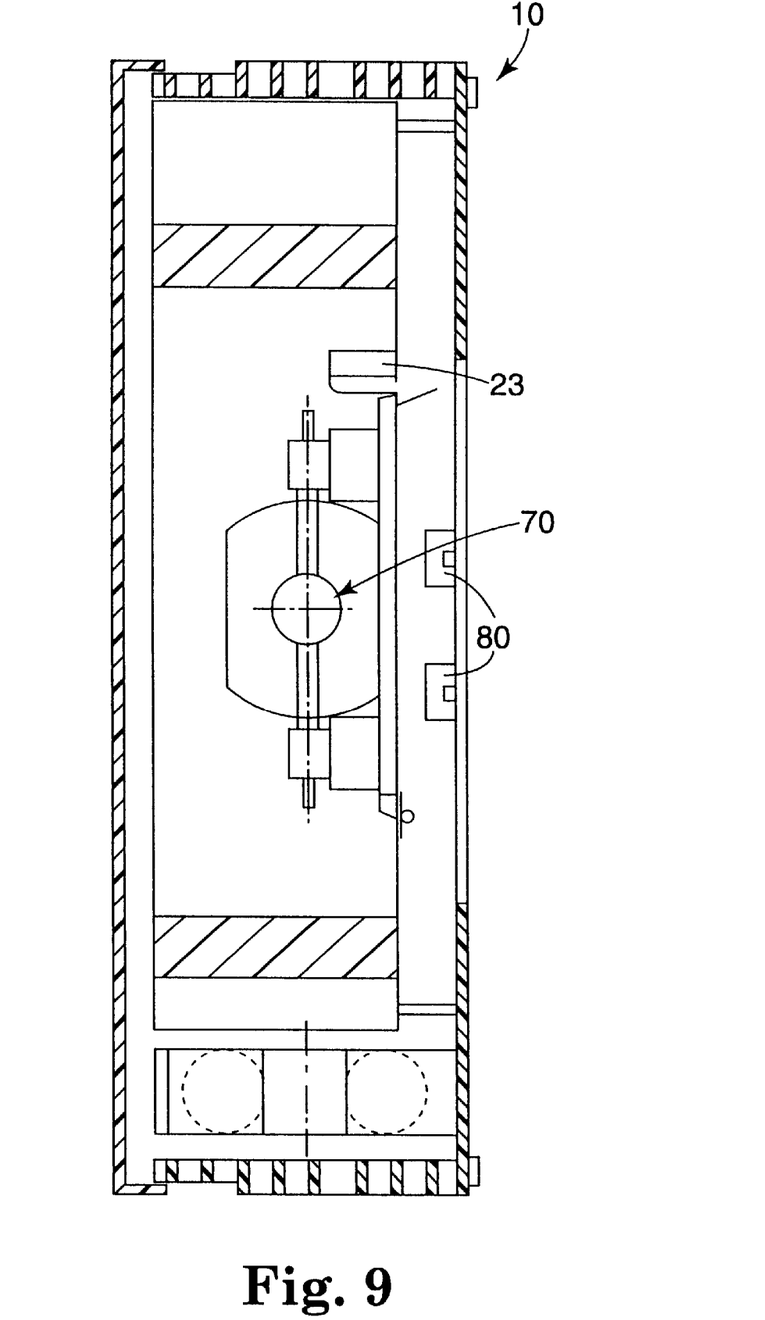
FIG. 9 is an elevation view of a cross-sectional cut at line 8—8 of the lamp assembly of the projector illustrated in FIG. 1 in the closed position.
Figures 10, 12:
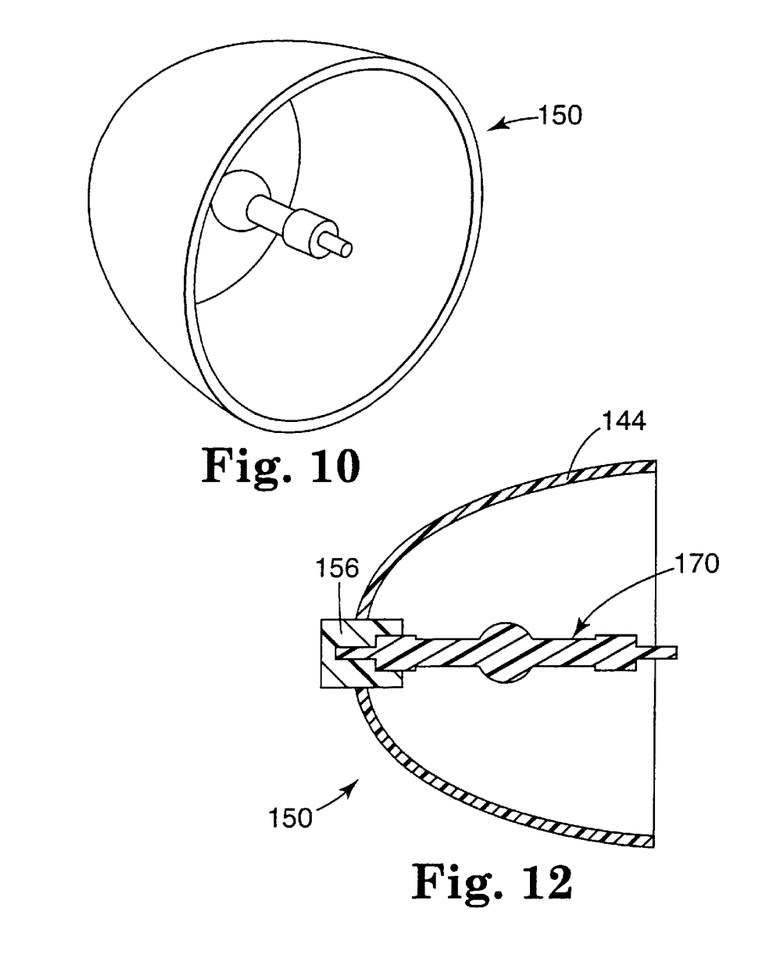
FIG. 10 is a perspective view of a second embodiment of a lamp assembly in accordance with the present invention.
FIG. 12 is a cross-sectional elevation view of the lamp assembly illustrated in FIG. 10.
Figure 11:
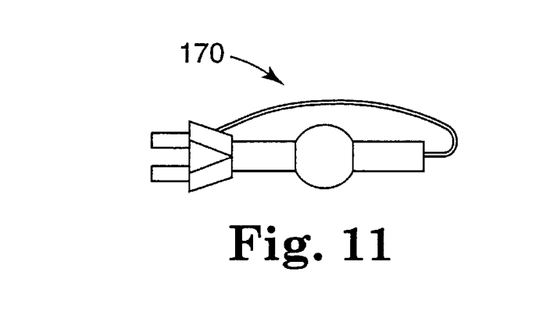
FIG. 11 is a side elevation view of a lamp used in the second embodiment of the present invention.
Figure 13:
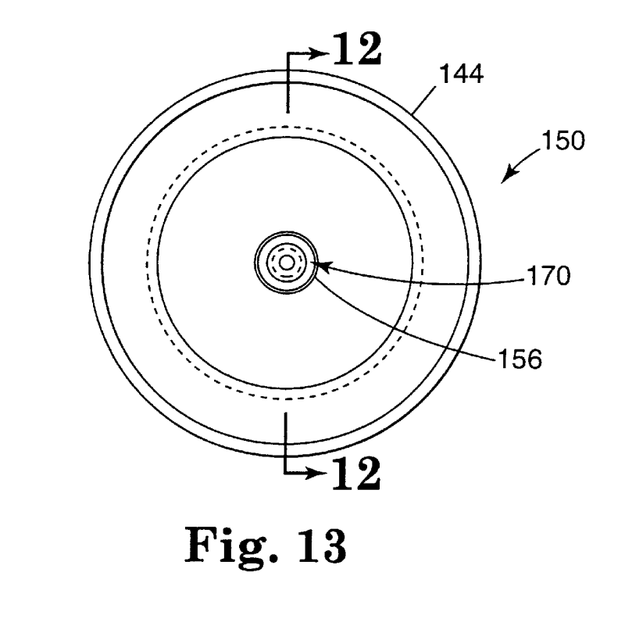
FIG. 13 is a front elevation view of the lamp assembly illustrated FIG. 10.

The lamp mount 50 has a closed position illustrated in FIG. 5 and 9 and an open position illustrated in FIG. 6–8. In the closed position, the lamp 70 is positioned within the recess 14 and is aligned inside the plenum 22 with respect to the LCD 30 and the optical projection system 40. A latch 23 secures the lamp mount in the closed position. Registration features including the registration bracket 62, latch 23, and registration profiles 64 on the periphery of recess 14 help secure the lamp mount 50 in the closed position and help to align correctly the lamp 70.

The lamp 70, illustrated in detail in FIG. 7, is secured by releasable sockets 56 and 58. Projector 10 uses a metal halide lamp, such as Model Nos. HMP 400DE and BS400DE, manufactured by Osram, and Sylvania, respectively. The lamp 70 is a metal halide lamp and includes a slender and longitudinally shaped bulb 72 that has a quartz or equivalent fused silicon envelope enclosing mercury and a rare earth gas. Two electrodes 74 are aligned along the axis of the lamp and project into the bulb 72. The electrodes 74 are set a certain distance apart within the bulb 72, to define an electrode gap 76. In the operating state, an arc forms across the electrode gap 76 between the two electrodes 74. Two contact end terminals 78, generally located at either end of the lamp 70, electrically connect to the electrodes 74. Two thermally conducting caps 75 generally ceramically seal the ends of the lamp 70.

As illustrated in FIGS. 6–8, in the open position, the lamp 70, mounted on the lamp mount 50, swings or pivots to a user accessible position generally outside of the projector body 12. In the present embodiment, the lamp mount 50 may be rotated approximately 90° for easy access. The hinge 54 of the present embodiment is a flat hinge coupling a lower edge 63 of the registration bracket 62 with the body 12. Those skilled in the art will recognize that a variety of hinge designs and placements may be possible. In other embodiments, the lamp assembly may have a different freedom of movement, such as 180°, or may be placed on a translational hinge that causes the assembly to rotate and project outwardly simultaneously.

Alternatively, hingeless designs may be possible. One particular alternative design, includes a lamp mount positioned as a drawer that slides in rails or grooves in and out of the housing 12. A drawer design offers the advantage of restricting the freedom of movement of the lamp mount to aid in ensuring correct alignment.

The sockets 56 and 58 are spring biased, electrically conducting metal brackets longitudinally aligned along the z-axis to receive the lamp 70. In contrast to traditional potted, i.e., fixed, designs, the sockets 56 and 58 are releasable, to allow the replacement of the lamp 70. The sockets 56 and 58 include clamps 57 and contacts 59. The clamps 57 secure to the end caps 75 and align the ends of the lamp 70 in the x and y axis. During operation of the lamp 70, the end caps 75 of the lamp 70 aid in diffusing the heat generated by the electrical arc. The clamps 57 are thermally conductive and are coupled to act as a heat sink to help regulate the temperature of the lamp 70 and of the sockets 56 and 58. Temperature regulation extends the life of the lamp 70 and allows for faster cooling of the lamp 70, features that help make the use of high-energy user-replaceable metal halide lamps possible.

The contacts 59 are Y or U-shaped and provide an electrical connection to the contact terminals 78. The crook in the U-shape of the contacts 59 receives the contact terminals and aids in aligning the lamps along the longitudinal z-axis. In the present embodiment, the lamp 70 is an ac lamp having identical electrodes. Accordingly, there is no positive or negative contact and the lamp is aligned correctly regardless of its polar direction. The brackets 56 and 58 are unidirectional, that is, they are configured to accept the lamp 70 only when the lamp is pointing in the correct direction. Cables 60 are electrically interconnected to the sockets 56 and 58 to provide an open circuit to be closed by the lamp 70. Other socket designs known in the art may be utilized. Alternatively, a socket may combine both a securing mechanism and an electrical contact, such as plug-in or screw-in arrangements.

As illustrated in FIG. 7, in the open position the lamp 70 is readily accessible to the user. The lamp 70 then may be replaced by disengaging the old lamp from the sockets 56 and 58 and snapping a new lamp into the sockets for electrical mating. When opening the door 21, a safety switch 80, illustrated in FIG. 8, automatically disconnects both sides of the line voltage for safety when the lamp mount 50 is in the open position. The door 21 includes two pins 82 that press on safety switch 80 and activate the line voltage when the door 21 is replaced in a closed position. Other safety switch designs, including a manual switch, are possible.

As seen in FIGS. 8 and 9, once replaced, the new lamp 70 is aligned at a desired position along the x, y and z axis by the brackets 56 and 58. The use of two brackets and the constraints imposed on the movement of the lamp mount 50 by the hinge 54 limit the freedom of movement and possible misalignment of the lamp 70. Upon return to the closed position, the registration features further help secure the optical alignment of the lamp 70 with respect to the optical projection system, as seen in FIG. 9. Those skilled in the art will recognize the more optimal positions for the lamp with respect to a variety of different optical projection systems.

FIGS. 10–13 illustrate an alternative embodiment including a single-ended metal-halide lamp 170, such as OSRAM HMI 123 from OSRAM, Germany. The single-ended lamp 170 is placed in a lamp mount 150 that includes a socket 156 and a reflector 144. The lamp mount 150 would be placed in a hinged tray similar to that of the projector 10 illustrated in FIGS. 1–9. The socket 156 includes a releasable securing mechanism having registration features, such as a plug-in or screw-in connector, to secure, electrically connect, and align the lamp 170.

The design of the present invention offers consistent lamp registration, user intuitiveness, and allows the user the ability to replace lamps easily without dismantling of the projector assembly. As metal halide lamps are used in a variety of lighting applications, the price and availability of metal halide lamps generally is superior to that of dedicated specially designed projector cartridge lamps. The user may carry spare lamps or may readily obtain spare lamps from a lighting supply store.

The embodiments described and illustrated herein are illustrative only, and are not to be considered as limitations upon the scope of the present invention. Those skilled in the art will recognize that other variations and modification may be made in accordance with the spirit and scope of the present invention.

What is claimed is:

1. An electronic projector comprising:
   a projector body having a lamp assembly recess;
   an optical projection system;
   a display panel;
   a lamp mount coupled to the projector body configured to accept a lamp, the lamp mount having an open position where the lamp mount moves outside of the projector body and a closed position where the lamp mount moves into the lamp assembly recess inside the projector body; and
   a first lamp socket aligned on the lamp mount, the lamp socket including lamp alignment features that orient and align the lamp;
   wherein the lamp mount further includes registration features, wherein in the closed position of the lamp mount, the lamp alignment features and the registration features optically align the lamp with respect to the optical projection system and the display panel.

2. The projector of claim 1, wherein the lamp mount is coupled to the projector body by a hinge.

3. The electronic projector of claim 1, wherein the lamp mount includes thermally conductive clamps arranged to secure thermally conductive portions of the lamp and wherein the clamps are thermally coupled to act as a heat sink.

4. The projector of claim 1, wherein the registration features includes a hinge coupled to the lamp mount and to the projector body and a registration bracket coupling to the projector body in the closed position and wherein the registration features repeatably align the lamp with respect to the optical projection system and the display panel when the lamp mount is placed in the closed position.

5. The projector of claim 1, wherein the lamp is a metal halide lamp.

6. The projector of claim 1, the lamp mount including a second socket mounted on the lamp mount, wherein the first and the second socket are linearly aligned to accommodate a lamp having a generally longitudinal shape.

7. The projector of claim 1, wherein the socket includes an electrical contact to establish an electrical connection with the lamp.

8. The projector of claim 1, wherein the socket is unidirectional.

9. The projector of claim 1, the display panel including a liquid crystal display.

10. The projector of claim 1, further comprising a removable lamp door generally covering the recess.

11. The projector of claim 1, further comprising a safety switch that automatically disconnects line voltage to the lamp when the lamp mount is in the open position.

12. The projector of claim 1, wherein the socket includes an electrically conductive spring biased clamp.

13. A projector comprising:
   a projector body having a lamp assembly recess;
   an optical projection system;
   a lamp mount coupled to the projector body configured to receive a lamp, the lamp mount having an open position where the lamp mount moves outside of the projector body and a closed position where the lamp mount moves into the lamp assembly recess inside the projector body; and
   a first lamp socket aligned on the lamp mount and arranged for securing and electrically coupling a replaceable lamp, the lamp socket having a releasable securing mechanism for receiving and aligning the replaceable lamp in a desired orientation and alignment, a thermally conductive clamp that generally surrounds a thermally conductive portion of the lamp and an electrical contact;
   wherein in the closed position of the lamp mount, the lamp is oriented and optically aligned at a desired position with respect to the optical projection system and in the open position of the lamp mount the lamp generally is outside of the projector body, wherein the socket includes a U-shaped end contact and the thermally conductive clamp is thermally coupled as a heat sink.

14. A liquid crystal display projector for projecting images on a screen, the projector comprising:

a projector body;

a display panel;

an optical projection system;

a releasable first self-aligning lamp socket for receiving a first end of a longitudinal replaceable bulb;

a releasable second self-aligning lamp socket for receiving a second end of the longitudinal replaceable bulb; and a platform hingedly coupled to the projector body, the platform having registration alignment features, wherein the lamp sockets are mounted on the platform, the platform having a first position where the platform swings the bulb outside of the projector body and a second position where the platform swings the bulb into an interior position inside the projector body and the self-aligning sockets and the registration alignment features optically align and orient the bulb at a predetermined precise position with respect to the optical projection system.

15. The liquid crystal display projector of claim 14, the registration alignment features comprising a registration mechanism that secures the hinged platform and the projector body in alignment in the closed position.

16. The liquid crystal display projector of claim 14, wherein the lamp sockets are configured to accommodate a metal halide lamp.

17. The liquid crystal display projector of claim 14, wherein the lamp sockets are thermally conductive and include a heat sink.

18. A lamp assembly for receiving a replaceable bulb in an electronic projection system, the lamp assembly comprising:

a lamp housing having a lamp recess;

a hinged lamp mount generally hingedly coupled to the lamp housing, the lamp mount having an interior surface and an exterior surface;

a lamp receiving socket positioned on the interior surface of the lamp mount for receiving a lamp, the lamp receiving socket including a lamp retaining mechanism, lamp alignment and orientation features and an electrical contact, the lamp retaining mechanism including a heat sink;

wherein the lamp mount further includes internal alignment registration features and the lamp mount pivots to an open position where the lamp is outside of the lamp housing, and to a closed position where the lamp is contained and aligned and oriented at a precise predetermined position within the lamp recess of the lamp housing.

19. A liquid crystal display projector including the lamp assembly of claim 18.

20. The lamp assembly of claim 18, wherein the lamp assembly is configured to accommodate a metal halide lamp.

* * * * *

UNITED STATES PATENT AND TRADEMARK OFFICE
CERTIFICATE OF CORRECTION

PATENT NO.: 6,082,864
DATED: July 4, 2000
INVENTOR(S): Ernesto M. Rodriguez, Jr., and Paul A. Müller

It is certified that error appears in the above-identified patent and that said Letters Patent is hereby corrected as shown below:

[73] "Ed. Liesegang; Minnesota Mining and Manufacturing Company" should read
-- Minnesota Mining and Manufacturing Company --.

Signed and Sealed this

Tenth Day of April, 2001

*Attest:*

NICHOLAS P. GODICI

*Attesting Officer*   Acting Director of the United States Patent and Trademark Office